United States Patent Office 2,877,241
Patented Mar. 10, 1959

2,877,241

11α,17α-DIHYDROXY - NORMAL PREGNANE-3,20-DIONE AND 11α-ESTERS THEREOF

Gunther S. Fonken, Kalamazoo, Robert H. Levin, Kalamazoo Township, Kalamazoo County, and A Vern McIntosh, Jr., Kalamazoo, Mich., assignors to The Upjohn Company, Kalamazoo, Mich., a corporation of Michigan No Drawing. Application September 25, 1953
Serial No. 382,452

4 Claims. (Cl. 260—397.45)

The present invention relates to 11α-oxygenated steroids and is particularly concerned with novel 11-oxygenated-17α-hydroxy-pregnane-3,20-diones selected from the group consisting of normal and allo 11α,17α-dihydroxypregnane-3,20-dione and normal and allo 11α-acyloxy-17α-hydroxy-pregnane-3,20-dione, wherein the acyl radical is a hydrocarbon carboxylic acid containing up to and including eight carbon atoms.

This application is a continuation-in-part of copending application Serial Number 299,232, filed July 16, 1952, now Patent No. 2,714,599, issued August 2, 1955.

The novel normal and allo 11α,17α-dihydroxypregnane-3,20-diones are obtained by selective oxidation of normal and allo 3α,11α,17α-trihydroxypregnan-20-one with tertiary butyl hypochlorite or by hydrogenation of 11α,17α-dihydroxyprogesterone in the presence of a palladium catalyst; the novel 11α-esters, by oxidation of 11α-acyloxy-3α,17α-dihydoxypregnan-20-one (normal or allo) with tertiary butyl hypochlorite or by hydrogenation of an 11α-acyloxy-17α-hydroxyprogesterone wherein the acyl radical of a hydrocarbon carboxylic acid containing up to and including eight carbon atoms, in the presence of a palladium catalyst or by acylation of the 11α,17α-dihydroxypregnane-3,20-diones. 11α,17α-dihydroxypregnane-3,20-dione or 11α-esters thereof (unless otherwise specified these terms shall include both the normal and allo forms) can also be obtained by reducing 4-chloro- or 4-bromo-11α,17α-dihydroxypregnane-3,20-diones or 11α - esters thereof with zinc and acetic acid.

It is an object of the present invention to provide 11α,17α-dihydroxypregnane-3,20-dione (normal and allo) and 11α-esters thereof. Other objects of the present invention will be apparent to those skilled in the art to which this invention pertains.

The novel compounds of the present invention, 11α,17α-dihydroxypregnane-3,20-dione and esters thereof, have utility per se as physiologically active agents having gonadohormonal activity without inhibition of the gonadotrophic hormonal secretion. Both the normal and allo compound, i. e., 11α,17α-dihydroxynormalpregnane-3,20-dione and 11α,17α-dihydroxyallopregnane-3,20-dione are furthermore valuable as intermediates for the conversion into physiologically active adrenal hormones. For example, 11α,17α-dihydroxynormalpregnane-3,20-dione can be converted to cortisone acetate, by forming the 3-ketal with ethylene glycol, brominating with bromine in acetic acid to obtain 11α,17α-dihydroxy-21-bromopregnane-3,20-dione 3-ethylene glycol ketal, hydrolyzing the 3-ketal group with hydrochloric acid to obtain 11α,17α-dihydroxy-21-bromopregnane-3,20-dione, oxidizing this dione with chromic acid to obtain 17α-hydroxy-21-bromopregnane-3,11,20-trione which can be converted to cortisone acetate by the method of Kritchevsky, Garmaise and Gallagher [J. Am. Chem. Soc., 74, 484 (1952)]. Similarly 11α,-17α-dihydroxyallopregnane-3,20-dione is converted into 17α - hydroxy-21-bromo-allopregnane-3,11,20-trione and the resulting trione reacted with potassium acetate to yield 17α-hydroxy-21-acetoxyallopregnane-3,11,20-trione, a steroid compound which was converted by Djerassi et al. [Nature, 168, 28 (1951)] to cortisone acetate.

A starting compound for the preparation of 11α,17α-dihydroxynormalpregnane-3,20-dione is 3α,11α,17α-trihydroxypregnan-20-one prepared from 3α,17α-dihydroxypregnane-11,20-dione as shown in Preparations 1 and 2. Another starting compound for the preparation of 11α,17α-dihydroxynormalpregnane-3,20-dione and 11α,17α-dihydroxyallopregnane-3,20-dione is 11α,17α-dihydroxyprogesterone [Meister et al., J. Am. Chem. Soc., 75, 416 (1953)]. Another starting compound for the preparation of 11α,17α-dihydroxypregnane-3,20-dione is 4-chloro-11α,17α-dihydroxypregnane-3,20-dione [Levin et. al., J. Am. Chem. Soc. 75, 502 (1953)]. The corresponding bromo compound, 4-bromo-11α,17α-dihydroxypregnane-3,20-dione, prepared by simultaneous oxidation and bromination of 3α,11α,17α-trihydroxypregnan-20-one with N-bromosuccinimide (Preparation 6) can also be used.

Starting materials for the preparation of the 11α-esters of 11α,17α-dihydroxypregnane-3,20-dione are obtained by esterifying 3α,11α,17α-trihydroxypregnan-20-ones and selectively hydrolyzing the thus-obtained 3α,11α-diacyloxy-17α-trihydroxypregnan-20-ones (of Preparations 3 and 4) or by esterifying 11α,17α-dihydroxyprogesterone or 4-halo-11α,17α-dihydroxypregnane-3,20-dione. Esterification can be accomplished by standard methods such as by admixing 11α,17α-dihydroxyprogesterone or 4-halo-11α,17α-dihydroxypregnane-3,20-dione with an acylating agent such as, for example, ketene, an acid, acid chloride or bromide or an acid anhydride, or other known acylating agent, usually in a solvent such as, for example, pyridine, or the like, or an inert solvent, including solvents like benzene, toluene, ether, and the like and heating at a temperature between about zero degrees centigrade and the boiling point of the reaction mixture, usually about room temperature, for a period between about a half hour and about 96 hours. The time of reaction as well as the temperature at which the reaction is carried out, the acylating agent, and the ratio of reactants can be varied. The ester is recovered from the reaction mixture by pouring into ice or cold water, collecting in an appropriate solvent, and washing with successive portions of a mildly basic solution and water to obtain a solution of the product which is essentially neutral. In some instances, the ester crystallizes from the reaction mixture, in which case it is advantageously separated by filtration or other means, washed with water, and thereafter purified by conventional means, such as, by recrystallization from a suitable solvent or by chromatographic purification, as deemed necessary.

Representative 11α-esters of 3α,11α,17α-trihydroxypregnan-20-one, 11α,17α-dihydroxyprogesterone or 4-chloro-11α,17α-dihydroxypregnane-3,20-dione which can be used as starting materials include the formate, acetate, propionate, β-cyclopentylpropionate, butyrate, isobutyrate, valerate, isovalerate, hexanoate, heptanoate, octanoate, benzoate, phenylacetate, mono-chloroacetate, di- and trichloroacetate, salicylate, halo- and nitro-benzoates, anisate, toluates, gallate, acid succinates, maleates, tartrates, citrates, oxalates, and like hydrocarbon carboxylic acid, and other like acids possessing from one to eight carbon atoms, inclusive.

According to one procedure the novel compound, 11α, 17α-dihydroxynormalpregnane and esters can be prepared by oxidation of 3α,11α,17α-trihydroxypregnan-20-one or esters thereof with tertiary butyl-hypochlorite (Examples 1 and 2).

According to another procedure, the novel compounds, 11α,17α-dihydroxynormalpregnane-3,20-dione and 11α, 17α-dihydroxyallopregnane-3,20-dione, or the corresponding 11α-esters thereof, can be prepared by hydrogenating 11α,17α-dihydroxyprogesterone, or an 11α-ester thereof, in the presence of a palladium hydrogenation catalyst (Examples 3 and 4) supported by a catalyst support, such as zinc oxide-carbonate or charcoal at room temperature, suitably at about twenty to thirty degrees centigrade.

According to a third procedure, 11α,17α-dihydroxypregnane-3,20-dione can be prepared by reduction of 4-chloro-11α,17α-dihydroxypregnane-3,20-dione with acetic acid and zinc dust at room temperature as shown in Example 5.

11α-esters of 11α,17α-dihydroxynormalpregnane-3,20-dione and 11α,17α-dihydroxyallopregnane-3,20-dione can be obtained as already stated by oxidizing the corresponding 11α-esters of 3α,11α,17α-trihydroxypregnan-20-one or by hydrogenating the corresponding 11α-esters of 11α,17α-dihydroxyprogesterone or reducing the corresponding 11α-ester of 4-chloro- or bromo-11α,17α-dihydroxypregnane-3,20-diones. An alternate procedure to obtain 11α-esters of 11α,17α-dihydroxypregnane-3,20-diones is to esterify the obtained products, 11α,17α-dihydroxynormalpregnane-3,20-dione and its allo isomer, 11α,17α-dihydroxyallopregnane-3,20-dione, by conventional procedures, as discussed above in connection with the esterification of the starting materials.

The following examples are illustrative of the products of the present invention and their preparation, but are not to tbe construed as limiting.

PREPARATION 1

3α,17α-dihydroxypregnane-11,20-dione 20-ethylene glycol ketal

A mixture of 260 milligrams of 3α,17α-dihydroxypregnane-11,20-dione [Kritchevsky, Garmaise, and Gallagher, J. Am. Chem. Soc., 74, 483 (1952)], five milliliters of ethylene glycol, fifty milligrams of para-toluenesulfonic acid monohydrate and 100 milliliters of benzene was placed in a reaction flask which was equipped with a reflux condenser and a water trap so arranged that the condensed vapors passed through the water trap before returning to the reaction flask. The mixture was heated to reflux and was allowed to reflux for five hours while at the same time being agitated. The water which formed was removed by co-distillation with benzene and was collected in the water trap. The reaction mixture was cooled and poured into a dilute solution of sodium bicarbonate. The benzene layer was separated, washed with water, dried and concentrated to dryness. The residue was chromatographed over forty grams of Florisil magnesium silicate using eight-milliliter portions of a mixture of ethylene dichloride with successively greater proportions of acetone for elution. The material, which was eluted with ethylene dichloride-acetone (12:1 and 8:1), weighed 141 milligrams after removal of the solvents. Recrystallization from benzene-Skellysolve B (Skellysolve is a mixture of hexanes) gave fifty milligrams of 3α,17α-dihydroxypregnane-11,20-dione 20-ethylene glycol ketal melting at 144 to 146 degrees centigrade.

Analysis.—Calculated for $C_{23}H_{36}O_5$: C, 70.37; H, 9.25. Found: C, 70.65; H, 9.28.

PREPARATION 2

3α,11α,17α-trihydroxypregnan-20-one and 3α,11β,17α-trihydroxypregnan-20-one

To a solution of two grams of lithium aluminum hydride in 200 milliliters of anhydrous ether was added dropwise, with stirring, two grams of 3α,17α-dihydroxypregnane-11,20-dione 20-ethylene glycol ketal from Preparation 1 in twenty milliliters of anhydrous benzene. The mixture then was stirred at room temperature for one hour followed by boiling under reflux for an additional hour. With continued stirring the resulting mixture was cooled and treated cautiously with water added dropwise. The resulting solution containing the 3α,11α,17α-trihydroxypregnan-20-one 20-ethylene glycol ketals then was admixed with a ten-fold excess of dilute hydrochloric acid and the resulting heterogeneous mixture was stirred vigorously for twenty hours at room temperature. The product was isolated by separating the organic and aqueous layers, extracting the aqueous layer with ether, combining the ether extract with the organic layer, washing the organic solution twice with water, drying the washed solution over anhydrous sodium sulfate, removing the drying agent by filtration, removing the solvents by distillation under reduced pressure, dissolving the resulting residual oil in ethyl acetate, and adding Skellysolve B to give an opalescent solution. The crystals obtained (crop A), 540 milligrams, were removed by filtration, and an additional quantity of Skellysolve B was added to the filtrate. The crystals obtained from the diluted filtrate (crop B) were separated by filtration and weighed 590 milligrams. An additional quantity of crystals identical with those of crop B was obtained from the remaining mother liquor by distillation of the solvents under reduced pressure, redissolving the residual oil in a minimum amount of ethyl acetate, and diluting with Skellysolve B.

Crop A was recrystallized twice from a mixture of ethyl acetate and Skellysolve B and once from a mixture of acetone and Skellysolve B to give 240 milligrams of 3α,11α,17α-trihydroxypregnan-20-one as needles; melting point 184–186 degrees centigrade; $[\alpha]_D^{23}$ plus 52 degrees in acetone.

Analysis.—Calculated for $C_{21}H_{34}O_4$: C, 71.9; H, 9.71. Found: C, 72.2; C, 72.3; H, 9.53; H, 9.66.

PREPARATION 3

3α,11α-diacetoxy-17α-hydroxypregnan-20-one

One hundred milligrams (100 milligrams) of 3α,11α,17α-trihydroxypregnane-20-one, dissolved in two milliliters of pyridine, were treated with one milliliter of acetic anhydride at room temperature. After standing for a period of four hours, the solution was poured onto fifty grams of crushed ice. After the ice had melted, the mixture was filtered and the thus-obtained precipitate was recrystallized from ethyl acetate and Skellysolve B to yield pure 3α,11α-diacetoxy-17α-hydroxypregnan-20-one.

PREPARATION 4

3α,17α-dihydroxy-11α-acetoxypregnan-20-one

The 3α,11α-diacetoxy-17α-hydroxypregnan 20-one obtained in Preparation 4 was dissoved in ten milliliters of ethanol. Thereto was added fifteen milligrams of sodium hydroxide dissolved in two milliliters of water. The mixture was allowed to stand for sixteen hours, poured into one hundred milliliters of water and neutralized by the addition of dilute hydrochloric acid. The thus-obtained precipitate was collected on filter and recrystallized to give 3α,17α-dihydroxy-11α-acetoxypregnan-20-one.

PREPARATION 5

4-chloro-11α-benzoyloxy-17α-hydroxypregnane-3,20-dione

One hundred milligrams (100 milligrams) of 4-chloro-11α,17α-dihydroxypregnane-3,20-dione, dissolved in two milliliters of pyridine, were treated with one milliliter of benzoyl chloride at room temperature. After standing for a period of sixteen hours the solution was poured into ice water and filtered. The precipitate was recrystallized from a mixture of ether and hexane (Skellysolve B) to yield pure 4-chloro-11α-benzoyloxy-17α-hydroxy-pregnane-3,20-dione.

PREPARATION 6

4-bromo-11α,17α-dihydroxypregnane-3,20-dione

To a solution of 175 milligrams of 3α,11α,17α-trihydroxy-pregnan-20-one, dissolved in three milliliters of tertiary butyl alcohol, was added 90 milligrams of N-bromosuccinimide in seven milliliters of tertiary butyl alcohol followed by three milliliters of 0.08 N sulfuric acid. After six hours the excess of hydrobromous acid was destroyed by the addition of a few drops of sodium bisulfite solution. The solvent was evaporated and the remaining crystals washed well with water. Recrystallization from alcohol gave pure 4-bromo-11α,17α-dihydroxypregnane-3,20-dione.

PREPARATION 7

*4-bromo-11α-acetoxy-17α-hydroxypregnane-3,20-dione*

One hundred milligrams (100 milligrams) of 4-bromo-11α,17α-dihydroxypregnane-3,20-dione (Preparation 6), dissolved in one milliliter of pyridine, was treated with one milliliter of acetic anhydride at room temperature. The reaction mixture was allowed to stand during a period of sixteen hours and then diluted with water to thirty milliliters. The thus-obtained precipitate was collected by filtration. Extraction of the aqueous filtrate with an ether-chloroform mixture yielded additional crude 4-bromo-11α-acetoxy-17α-hydroxypregnane-3,20-dione. Recrystallization from an ether-Skellysolve B (hexanes) mixture yielded pure 4-bromo-11α-acetoxy-17α-hydroxypregnane-3,20-dione.

PREPARATION 8

*11α-acetoxy-17α-hydroxyprogesterone*

To a solution of 11α,17α-dihydroxyprogesterone in pyridine about two molar equivalents of acetic anhydride was added. The mixture was allowed to stand for one hour at room temperature, then diluted with water, cooled in a refrigerator and filtered. The thus-obtained crystals of 11α-acetoxy-17α-hydroxyprogesterone were washed and recrystallized from ethyl acetate-Skellysolve B (hexanes).

In the same manner as shown in Preparations 3, 4, 5, 7, and 8, other 11α-esters of 3α,11α,17α-trihydroxypregnan-20-one 4-chloro- and 4-bromo- of 11α,17α-dihydroxypregnane-3,20-dione or of 11α,17α-dihydroxyprogesterone are prepared. Such representative 11α-esters of 3α,11α,17α-trihydroxypregnan-20-one, 4-halo-11α,17α-dihydroxypregnane-3,20-dione and 11α,17α-dihydroxyprogesterone include one to eight carbon atoms carboxylic acid acyloxy esters of saturated or unsaturated aliphatic, cycloaliphatic, aryl, arylalkyl, alkaryl, mono, di, or polycarboxylic acids having less than eight carbon atoms, which form ester groups such as, for example, dimethylacetoxy, trimethylacetoxy, propionyloxy, butyryloxy, isobutyryloxy, valeryloxy, hexanoyloxy, heptanoyloxy, octanoyloxy, benzoyloxy, phenylacetoxy, toluyloxy, anisoyloxy, salicyloyloxy, gallyloxy, cyclopentylformyloxy, α-cyclopentylpropionyloxy, acryloxy, cyclohexylformyloxy, the half and di-esters of polybasic acids such as malonic, maleic, succinic, tartaric, citric, glutaric and adipic acids, and the like. The acids may also contain non-interfering substituents, such as mono or poly chloride, bromo, hydroxy, methoxy, mercapto, and the like if desired.

PREPARATION 9

*Palladium catalyst supported on zinc carbonate-zinc oxide mixture*

Eleven grams of anhydrous zinc chloride was dissolved in 100 milliliters of water at seventy degrees centigrade and a twenty percent aqueous solution of sodium carbonate was added in excess, with constant stirring, forming a precipitate of zinc carbonate. The precipitate was filtered, washed free of alkali with warm water and resuspended in 100 milliliters of water forming a slurry. To the aqueous slurry was added five milliliters of a palladium chloride solution containing 0.5 grams of palladium and then one milliliter of thirty-seven percent aqueous formaldehyde solution. The resulting red-brown colored mixture was warmed on a steam bath to about sixty degrees centigrade and a thirty precent aqueous solution of sodium hydroxide then added dropwise, with continuous stirring, until the pH of the mixture reached nine, at which point palladium precipitated. The black-colored precipitate was washed by decantation with ten successive fifty-milliliter portions of water and then filtered under suction. The precipitate on the filter funnel was washed six times, dried by suction, and heated in an oven at 210 degrees centigrade for a period of eleven hours. Six and eight-tenths grams of a brown colored catalyst consisting of palladium supported on a zinc carbonate-zinc oxide mixture was obtained.

EXAMPLE 1

*11α,17α-dihydroxypregnane-3,20-dione*

To five hundred milligrams (500 milligrams) of 3α,11α,17α-trihydroxypregnan-20-one (Preparation 2), dissolved in ten milliliters of anhydrous tertiary butyl alcohol was added 0.6 milliliter of tertiary butyl hypochlorite, prepared according to the procedure of Chettaway and Backeberg, J. Chem. Soc., 125, 2999 (1923). The reaction mixture was kept in the dark and stirred for four hours at room temperature (twenty to thirty degrees centigrade) whereafter the whole was evaporated to dryness at room temperature (twenty to thirty degrees centigrade) giving 11α,17α-dihydroxypregnane-3,20-dione of melting point 187 to 188 degrees centigrade. The infrared spectrum of this compound agreed with the structure postulated for 11α,17α-dihydroxypregnane-3,20-dione.

EXAMPLE 2

*11α-acetoxy-17α-hydroxypregnane-3,20-dione*

In the same manner as described in Example 1, 11α-acetoxy - 3α,17α - dihydroxypregnane - 20 - one (Preparation 4), dissolved in tertiary butyl alcohol, was oxidized with tertiary butyl hypochlorite at room temperature to give 11α - acetoxy - 17α - hydroxy - pregnane - 3,20-dione.

In the same manner as in Examples 1 and 2, other 11α - acyloxy - 17α - hydroxypregnane - 3,20 - diones are prepared by oxidizing the corresponding 3α,17α-dihydroxy - 11α - acyloxypregnane-20-ones with tertiary butyl hypochlorite. Representative 11α-esters thus obtained include: 11α - propionyloxy - 17α - hydroxy-pregnane-3,20-dione, 11α - (β - cyclopentylpropionyloxy) 17α-hydroxypregnane-3,20-dione, 11α-butyroxy-17α-hydroxypregnane-3,20-dione, 11α - isobutyroxy - 17α - hydroxypregnane-3,20 - dione, 11α - valeryloxy-17α - hydroxypregnane-3,20-dione, 11α - hexanoyloxy - 17α - hydroxypregnane - 3,20-dione, 11α - heptanoyloxy - 17α - hydroxypregnane-3,20-dione, 11α-octanoyloxy-17α-hydroxypregnane-3,20-dione, 11α - benzoyloxy - 17α-hydroxypregnane-3,20-dione, 11α-anisoyloxy - 17α - hydroxypregnane - 3,20 - dione, 11α-toluyloxy - 17α-hydroxypregnane-3,20-dione, 11α-gallyloxy - 17α - hydroxypregnane - 3,20 - dione, 11α - hemisuccinyloxy - 17α - hydroxypregnane - 3,20 - dione, 11α - hemimaleyloxy - 17α - hydroxypregnane - 3,20-dione, 11α-hemitartaryloxy - 17α - hydroxypregnane-3,20-dione, 11α-dihydrogencityloxy - 17α - hydroxypregnane - 3,20-dione, 11α - hemioxalyloxy - 17α - hydroxypregnane-3,20-dione, 11α - toluenesulfonyloxy - 17α - hydroxypregnane - 3,20-dione, and the like.

EXAMPLE 3

*11α,17α - dihydroxynormalpregnane-3,20 - dione and 11α,17α - dihydroxyallopregnane-3,20-dione*

Five hundred milligrams (500 milligrams) of a mixture of palladium on zinc oxide-zinc carbonate containing 7.5 percent of palladium (Preparation 9) suspended in fifteen milliliters of methanol was hydrogenated at a pressure of twenty pounds per square inch at room temperature, about 25 degrees centigrade. To this mixture was added a solution of one gram of 11α,17α-dihydroxyprogesterone dissolved in 125 milliliters of methanol. The hydrogenation was then continued at twenty pounds per square inch until one mole equivalent of hydrogen had been absorbed. The catalyst was then removed by filtration and the filtrate was chromatographed over a column containing twenty grams of a mixture consisting of activated carbon (Darco G–60) and diatomaceous earth (celite) in a one to two ratio. The following 200-milliliter fractions were collected:

Fractions 1 to 15, acetone; fractions 16 to 20, methylene dichloride.

Fractions 1 and 2 (acetone) were combined, evaporated and recrystallized from ethyl acetate-Skellysolve B (hexanes) yielding 200 milligrams of 11α,17α-dihydroxynormalpregnane-3,20-dione of melting point 186 to 188 degrees centigrade and rotation [α]$_D$+4° (in chloroform).

Fractions 17 and 18 (methylene dichloride) were combined, evaporated and recrystallized from ethyl acetate-Skellysolve B yielding five milligrams of 11α,17α-dihydroxyallopregnane-3,20-dione of melting point 203 to 206 degrees centigrade. The infrared spectrum of this compound confirmed the structure of 11α,17α-dihydroxyallopregnane-3,20-dione.

Paper chromatography on the crude syrup resulting from the hydrogenation indicated a ratio of one part of allo to nine parts of the normal product.

EXAMPLE 4

*11α - acetoxy - 17α - hydroxynormalpregnane - 3,20-dione and 11α - acetoxy - 17α-hydroxynormalpregnane-3,20-dione*

In the same manner as given in Example 3, 11α-acetoxy-17α-hydroxyprogesterone was hydrogenated in the presence of a palladium catalyst supported on charcoal to yield 11α-acetoxy-17α-hydroxypregnane-3,20-dione and 11α - acetoxy-17α-hydroxyallopregnane-3,20-diones which were separated by chromatography over a column of activated carbon and diatomaceous earth with acetone and methylene dichloride.

EXAMPLE 5

*11α - benzoyloxy - 17α - hydroxypregnane-3,20-dione and 11α-benzoyloxy-17α-hydroxyallopregnane-3,20-dione*

In the same manner as given in Example 3, 11α-benzoyloxy-17α-hydroxyprogesterone was hydrogenated in the presence of a palladium catalyst on zinc oxide-carbonate to yield 11α-benzoyloxy-17α-dihydroxypregnane-3,20-dione and 11α-benzoyloxy-17α-dihydroxyallopregnane-3,20-diones which were separated by chromatography as shown in Examples 3 and 4.

In the same manner as in Examples 3, 4, and 5, other 11α-esters of 11α,17α-dihydroxynormalpregnane-3,20-dione and 11α,17α-dihydroxyallopregnane-3,20-diones are prepared by hydrogenating the corresponding 11α-acyloxy-17α-hydroxyprogesterone with hydrogen in the presence of a palladium catalyst supported by oxides and carbonates of zinc, cadmium or mercury, or by charcoal. Representative 11α-esters thus obtained include: 11α-propionyloxy-17α-hydroxynormalpregnane-3,20 - dione and 11α-propionyloxy-17α-hydroxyallopregnane-3,20-dione, 11α-(β-cyclopentylpropionyloxy)-17α-hydroxynormalpregnane-3,20-dione and 11α-(β-cyclopentylpropionyloxy)-17α-hydroxyallopregnane-3,20-dione, 11α-butyroxy-17α-hydroxynormalpregnane-3,20-dione and 11α-butyroxy - 17α - hydroxyallopregnane - 3,20 - dione, 11α-isobutyroxy-17α-hydroxynormalpregnane-3,20-dione and 11α-isobutyroxy - 17α - hydroxyallopregnane-3,20-dione, 11α-valeroxy - 17α - hydroxynormalpregnane - 3,20-dione and 11α - valeroxy-17α-hydroxyallopregnane-3,20-dione, 11α-isovaleroxy - 17α-hydroxynormalpregnane-3,20-dione and 11α-isovaleroxy-17α-hydroxyallopregnane - 3,20 - dione, 11α-hexanoyloxy-17α-hydroxynormalpregnane-3,20 - dione and 11α-hexanoyloxy-17α-hydroxyallopregnane-3,20-dione, 11α - heptanoyloxy - 17α-hydroxynormalpregnane-3,20 - dione and 11α-heptanoyloxy-17α-hydroxyallopregnane - 3,20 - dione, 11α - octanoyloxy-17α-hydroxynormalpregnane-3,20-dione and 11α-octanoyloxy-17α-hydroxyallopregnane-3,20-dione, 11α-phenylacetoxy-17α-hydroxynormalpregnane-3,20-dione and 11α-phenylacetoxy-17α-hydroxyallopregnane-3,20-dione, 11α-monochloroacetoxy-17α-hydroxynormalpregnane-3,20-dione and 11α-monochloroacetoxy - 17α-hydroxyallopregnane-3,20-dione 11α-dichloroacetoxy - 17α - hydroxynormalpregnane - 3,20 - dione and 11α-dichloroacetoxy-17α-hydroxyallopregnane-3,20 - dione, 11α - trichloroacetoxy - 17α-hydroxynormalpregnane - 3,20 - dione and 11α-trichloroacetoxy-17α-hydroxyallopregnane-3,20-dione, 11α-salicyloyloxy-17α-hydroxynormalpregnane-3,20-dione and 11α-salicyloyloxy-17α-hydroxyallopregnane-3,20-dione, 11α-chlorobenzoyloxy - 17α - hydroxynormalpregnane - 3,20-dione and 11α-chlorobenzoyloxy - 17α - hydroxyallopregnane - 3,20 - dione, 11α-nitrobenzoyloxy-17α-hydroxynormalpregnane-3,20-dione and 11α-nitrobenzoyloxy-17α-hydroxyallopregnane-3,20-dione, 11α-anisoyloxy-17α-hydroxynormalpregnane-3,20-dione and 11α-anisoyloxy-17α-hydroxyallopregnane-3,20-dione, 11α-toluyloxy-17α-hydroxynormalpregnane-3,20-dione and 11α-toluyloxy-17α-hydroxyallopregnane-3,20-dione, 11α - gallyloxy-17α-hydroxynormalpregnane-3,20-dione and 11α-gallyloxy-17α-hydroxyallopregnane-3,20-dione, 11α-hemisuccinyloxy-17α - hydroxynormalpregnane-3,20-dione and 11α-hemisuccinyloxy-17α-hydroxyallopregnane - 3,20-dione, 11α-hemimaleyloxy-17α-hydroxynormalpregnane-3,20-dione and 11α-hemimaleyloxy - 17α - hydroxyallopregnane-3,20-dione, 11α-hemitartaryloxy - 17α - hydroxynormalpregnane - 3,20 - dione and 11α - hemitartaryloxy-17α-hydroxyallopregnane-3,20-dione, 11α - dihydrogencityloxy-17α-hydroxynormalpregnane - 3,20 - dione and 11α - dihydrogencityloxy-17α-hydroxyallopregnane - 3,20 - dione, 11α-hemioxalyloxy-17α-hydroxynormalpregnane-3,20-dione and 11α-hemioxalyloxy-17α-hydroxyallopregnane-3,20-dione, 11α-toluenesulfonyloxy - 17α - hydroxynormalpregnane - 3,20-dione and 11α - toluenesulfonyloxy - 17α - hydroxyallopregnane - 3,20-dione, and the like.

11α-esters of 11α,17α-dihydroxynormalpregnane-3,20-dione and 11α,17α-dihydroxyallopregnane-3,20-dione can also be obtained by esterification of 11α-17α-dihydroxynormalpregnane-3,20-dione and 11α,17α-dihydroxyallopregnane-3,20-dione (obtained in Example 1) by the methods already described.

EXAMPLE 6

*11α,17α-dihydroxynormalpregnane-3,20-dione*

To a solution of 4-chloro-11α,17α-dihydroxypregnane-3,20-dione [Levin et al., J. Am. Chem. Soc., 75, 502 (1953)] in acetic acid was added finely powdered zinc dust. The mixture was stirred at 22 to 25 degrees centigrade (room temperature) for a period of three hours, then filtered through glass wool, the filtrate was diluted with water and neutralized by the addition of sodium hydroxide solution. After cooling of the solution 11α,17α-dihydroxynormalpregnane-3,20-dione precipitated and was collected on a filter, washed and repeatedly recrystallized from ethyl acetate and Skellysolve B (hexanes) to give the pure material of melting point 191 to 192.5 degrees centigrade.

EXAMPLE 7

*11α-benzoyloxy-17α-hydroxypregnane-3,20-dione*

In the same manner as given in Example 6, 11α-benzoyloxy-17α-hydroxypregnane-3,20-dione is obtained by treating a solution of 4-chloro-11α-benzoyloxy-17α-hydroxypregnane-3,20-dione (Preparation 5) in acetic acid with zinc.

Similarly other 11α-esters of 11α,17α-dihydroxypregnane-3,20-diones are obtained by treating the corresponding 4 - chloro-11α-acyloxy-17α-hydroxypregnane-3,20-diones with zinc dust in acetic acid.

EXAMPLE 8

11α-acetoxy-17α-hydroxypregnane-3,20-dione

In the same manner as given in Examples 6 and 7, 11α-acetoxy-17α-hydroxypregnane-3,20-dione is obtained by treating 4-bromo-11α-acetoxy-17α-hydroxypregnane-3,20-dione (Preparation 7) dissolved in acetic acid, with zinc dust.

Treatment of other 4-bromo-11α-acyloxy-17α-hydroxypregnane-3,20-diones, wherein the acyloxy group is, for example, propionyloxy, butyroxy, valeryloxy, hexanoyloxy, heptanoyloxy, octanoyloxy, benzoyloxy, salicyloyloxy, β-cyclopentylpropionyloxy, and the like, with zinc dust and acetic acid is productive of the corresponding 11α-acyloxy-17α-hydroxypregnane-3,20-diones.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:
1. 11α,17α-dihydroxynormalpregnane-3,20-dione.
2. 11α-acyloxy-17α-hydroxynormalpregnane-3,20-dione wherein the acyl radical is of a hydrocarbon carboxylic acid containing up to and including eight carbon atoms.
3. 11α-acetoxy-17α-hydroxynormalpregnane-3,20-dione.
4. 11α-benzoyloxy-17α-hydroxynormalpregnane-3,20-dione.

No references cited.